US006994202B1

(12) United States Patent
Billington et al.

(10) Patent No.: US 6,994,202 B1
(45) Date of Patent: Feb. 7, 2006

(54) MONEY ACCEPTANCE METHOD AND APPARATUS

(75) Inventors: Gregory John Billington, Reading (GB); Andrew Simon Pope, Reading (GB); Christian Jon Fleuty, Wokingham (GB)

(73) Assignee: Mars Incorporated, McLean, VA (US)

( * ) Notice: Subject to any disclaimer, the term of this patent is extended or adjusted under 35 U.S.C. 154(b) by 607 days.

(21) Appl. No.: 09/543,164

(22) Filed: Apr. 5, 2000

(30) Foreign Application Priority Data

Apr. 8, 1999 (GB) .................................... 9908037

(51) Int. Cl.

| | |
|---|---|
| ***G06F 19/00*** | (2006.01) |
| ***G06F 7/00*** | (2006.01) |
| ***G06F 9/00*** | (2006.01) |
| ***G07F 9/08*** | (2006.01) |

(52) U.S. Cl. ........................................ 194/217; 453/17

(58) Field of Classification Search ................ 194/217; 453/17

See application file for complete search history.

(56) References Cited

U.S. PATENT DOCUMENTS

| | | | | |
|---|---|---|---|---|
| 3,914,889 | A | 10/1975 | Wagner | |
| 4,347,924 | A * | 9/1982 | Hayashi et al. | 194/346 |
| 4,499,985 | A | 2/1985 | Schuller | |
| 4,512,453 | A | 4/1985 | Schuller et al. | |
| 4,616,323 | A * | 10/1986 | Hayashi | 700/232 |
| 4,883,158 | A * | 11/1989 | Kobayashi et al. | 194/217 |
| 5,184,708 | A | 2/1993 | Levasseur | |
| 5,542,519 | A * | 8/1996 | Weston et al. | 194/217 |
| 5,566,807 | A * | 10/1996 | Morun | 194/217 |
| 5,728,999 | A * | 3/1998 | Teicher | 235/381 |
| 5,734,150 | A * | 3/1998 | Brown et al. | 235/381 |
| 5,895,457 | A * | 4/1999 | Kurowski et al. | 194/206 |
| 5,987,439 | A * | 11/1999 | Gustin et al. | 235/379 |
| 5,988,346 | A * | 11/1999 | Tedesco et al. | 194/217 |
| 6,055,521 | A * | 4/2000 | Ramsey et al. | 705/413 |
| 6,085,888 | A * | 7/2000 | Tedesco et al. | 194/217 |
| 6,102,162 | A * | 8/2000 | Teicher | 186/39 |
| 6,119,099 | A * | 9/2000 | Walker et al. | 705/16 |
| 6,196,371 | B1 * | 3/2001 | Martin et al. | 194/317 |
| 6,230,150 | B1 * | 5/2001 | Walker et al. | 705/400 |
| 6,298,329 | B1 * | 10/2001 | Walker et al. | 705/14 |
| 6,298,331 | B1 * | 10/2001 | Walker et al. | 705/15 |
| 6,330,978 | B1 * | 12/2001 | Molano et al. | 235/380 |
| 6,341,268 | B2 * | 1/2002 | Walker et al. | 705/15 |
| 6,397,193 | B1 * | 5/2002 | Walker et al. | 705/16 |
| 2001/0056376 | A1 * | 12/2001 | Walker et al. | |
| 2002/0161653 | A1 * | 10/2002 | Walker et al. | |

FOREIGN PATENT DOCUMENTS

| | | | |
|---|---|---|---|
| EP | 0 450 927 | A1 | 10/1991 |
| EP | 0 730 252 | A2 | 9/1996 |

* cited by examiner

*Primary Examiner*—Donald P. Walsh
*Assistant Examiner*—Jeffrey A. Shapiro
(74) *Attorney, Agent, or Firm*—Fish & Richardson P.C.

(57) ABSTRACT

A vending machine provides a warning indication that insufficient change may be available if the total amount of available change is less than the value of the highest-denomination monetary unit which is not refundable. An insufficient change indication is also provided in response to inserting a coin or instructing a vending operation which would result in the amount of refundable change being less than the correct amount by a value which is greater than a predetermined, alterable overpay amount.

10 Claims, 4 Drawing Sheets

MONEY ACCEPTANCE METHOD AND APPARATUS

The invention relates to money acceptance automatic transaction systems for dispensing products or performing services, and particularly but not exclusively to coin acceptance in coin operated vending machines.

Consumer convenience is a major concern in using automatic transaction systems, such as vending machines. Many vending machine customers often do not have exact change, and thus the machines typically are capable of accepting more money than is required and giving change. However, if the vending machine coin tubes that are used to dispense change are low or empty, then it may not be possible to purchase a product for the correct price unless the customer has the exact change.

A number of techniques have been used to deal with this situation. It is well known to provide a display, often in the form of a light illuminating the words "exact change", warning the customer that he will not be able to obtain a purchase for the correct price unless he inserts the exact amount required. In addition, or alternatively, the machine may be arranged so that a product is vended when the customer has inserted more than the correct price of the product, even when insufficient change is available. In these circumstances, it is normal for the machine only to perform this operation if the excess amount paid by the customer, known as the "overpay", does not exceed a predetermined limit.

One problem with such arrangements is that it is very difficult to determine all the circumstances in which the customer will be unable to make a purchase for the correct payment, partly because the machine does not know what change the customer will have available, and partly because, where the vending machine is capable of dispensing different products for different prices, the machine does not know which product will be selected. Accordingly, the "exact change" display may be given in circumstances where the customer might be able to purchase an item with a correct payment, or only a very small overpay amount, but nevertheless the provision of that display may deter the customer from attempting to make the purchase, so that a sale may be lost.

Aspects of the present invention are intended to mitigate at least some of the problems mentioned above.

In accordance with one aspect of the invention, a vending machine is operable to give a first indication that insufficient change may be available to a customer making a purchase as a warning prior to a transaction being initiated, and a second indication after a transaction has been initiated, each warning being produced in response to the detection of a respective set of conditions. This technique has the advantage that the first warning, which may deter a customer from attempting a purchase, can be given in circumstances in which it is very likely that an insufficient change problem may arise, but not in circumstances when insufficient change is possible but less likely. This means that the warning is given less frequently, and therefore customers are deterred less often. Although there are still circumstances in which change is inadequate for a particular transaction, this is notified to the user by way of the second indication.

Preferably, the first indication is given when the amount of available change in the machine is inadequate to refund the value of the highest denomination monetary unit which can be accepted for payment but which is unavailable for change. Normally, vending machines accept some denominations for payment and also store these denominations so that they can be dispensed as change (e.g. by storing them in change tubes). Other denominations may for example be fed to a common cashbox, and are unavailable for change. Thus, if the amount of available change is inadequate to refund the value of the highest denomination coin which can be accepted but not refunded, it is appropriate to provide the first indication because a customer may otherwise insert a high-denomination coin without the possibility of being fully refunded.

On the other hand, even when the warning is not given, there is a possibility that the combination of the money deposited in the machine, the money available for change and the price of the selected vend item will be such that insufficient change is available. The second indication may be given if this combination of conditions would result in the customer being underpaid by a predetermined amount (referred to herein as the "allowable overpay amount"). In these circumstances, the second indication is given, and the selected vend is inhibited, so that the customer may obtain a refund.

There may also be circumstances in which a non-refundable coin is deposited, and the difference between the value of that coin and the available change is greater than the allowable overpay amount. In other words, a deposited coin may lead to circumstances in which the amount refundable to the customer is less than he has inserted (or, possibly, less than the amount he has inserted minus the overpay amount). In these situations the second indication may be given, and acceptance of the deposited coin prevented, so that the customer does not run the risk of losing more value than the allowable overpay amount.

According to another aspect of the invention, a vending machine has an allowable overpay amount which represents the amount by which the correct change may exceed the available change without inhibiting an operation for the vending machine, wherein this allowable overpay amount is determined by an alterable parameter stored in the machine. This permits different vending machine operators to set different allowable overpay amounts to suit their individual desires or circumstances. For example, there may be geographical regions where a larger overpay amount is more acceptable than in other regions. The allowable overpay amount affects the ability of the vending machine to operate in certain circumstances, and may also affect the conditions under which "exact change" warnings are given. Accordingly, by allowing for a variable allowable overpay amount, it is possible to reduce the number of occasions on which customers are deterred from attempting a purchase.

Arrangements embodying the invention will now be described by way of example with reference to the accompanying drawings, in which.

The money acceptance apparatus and method of the present invention may be used for the dispensing of items including the vending of products, such as drinks, snacks, cigarettes, toiletries or tickets, currency exchange and the providing of services, such as in pay telephones or turnstiles. An embodiment of the invention is described below with reference to a product vending machine, but this is not meant to be a limitation on the application of this invention.

Figure 1:
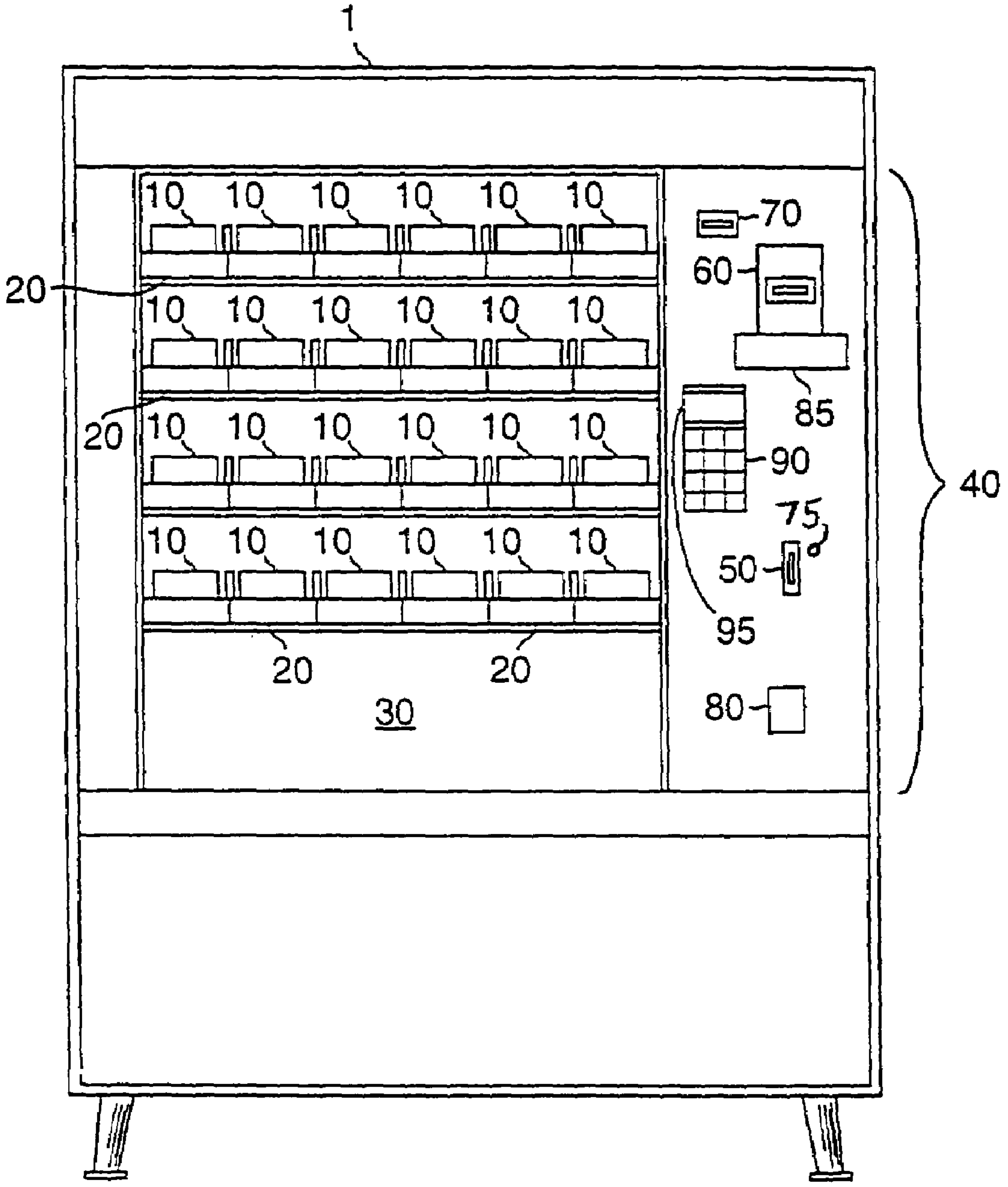
FIG. 1 is a front view of a typical vending machine which can operate according to the present invention.

FIG. 1 illustrates a vending machine 1 which contains a variety of products 10 to be dispensed which are stored in an area inaccessible to customers, such as behind a glass panel. Each product 10 is retained by a product delivery apparatus 20 which is selectively actuable to dispense the product into a delivery area 30 that is accessible to the customer. Suitable product delivery apparatus 20 include vend motors and solenoids as well as others well known in the art. Examples of such apparatus include those described in U.S. Pat. Nos. 4,458,187 and 4,785,927, which are hereby incorporated by reference.

A control panel 40 of the vending machine 1 contains a coin slot 50 and a banknote or bill insert slot 60 which accept currency to initiate a vend operation. The control panel 40 further contains a card acceptor 70 to enable customers to initiate a transaction with a credit or debit card. In addition, an electronic purse device in the form of a card may be inserted into the card acceptor 70 to initiate a transaction. The term "electronic purse device" is used herein to denote a token or card possessing an electronic circuit, a magnetic strip or other data storing medium or circuitry, for retaining a credit value. An electronic purse device may be in one of a variety of shapes, including a key or coin, as well as the card. Such devices may be used as currency in a variety of conventional automatic transaction systems.

A coin return button 75, a coin return recess 80, a bill payout recess 85 and an item selector such as a keypad 90 are also provided in the control panel 40. A display 95 on the control panel 40 provides instructions and information to the customer. Suitable displays 95 include dot-matrix displays, selectively activatable message lights, an electronic scrolling message, or other displays capable of operating in the environmental conditions to which automatic transaction systems are typically exposed.

A customer may initiate a transaction by depositing coins or bills of particular denominations in the slots 50 or 60, respectively. The customer may also insert an electronic purse device, or a debit or credit card in the card acceptor 70 to initiate a transaction. Once sufficient payment has been deposited in the automatic transaction system 1, the customer may select a product 10 to be dispensed using the keypad 90. The corresponding product delivery apparatus 20 will then dispense the selected product 10 to the product delivery area 30 where it may be retrieved by the customer. Any resulting change from the transaction may be paid out through the coin return recess 80, the bill payout recess 85 or credited to an inserted electronic purse device. Before instructing a vend, a customer can press coin return button 75 to obtain a refund of coins in the amount of any coins he has inserted.

Figure 2:
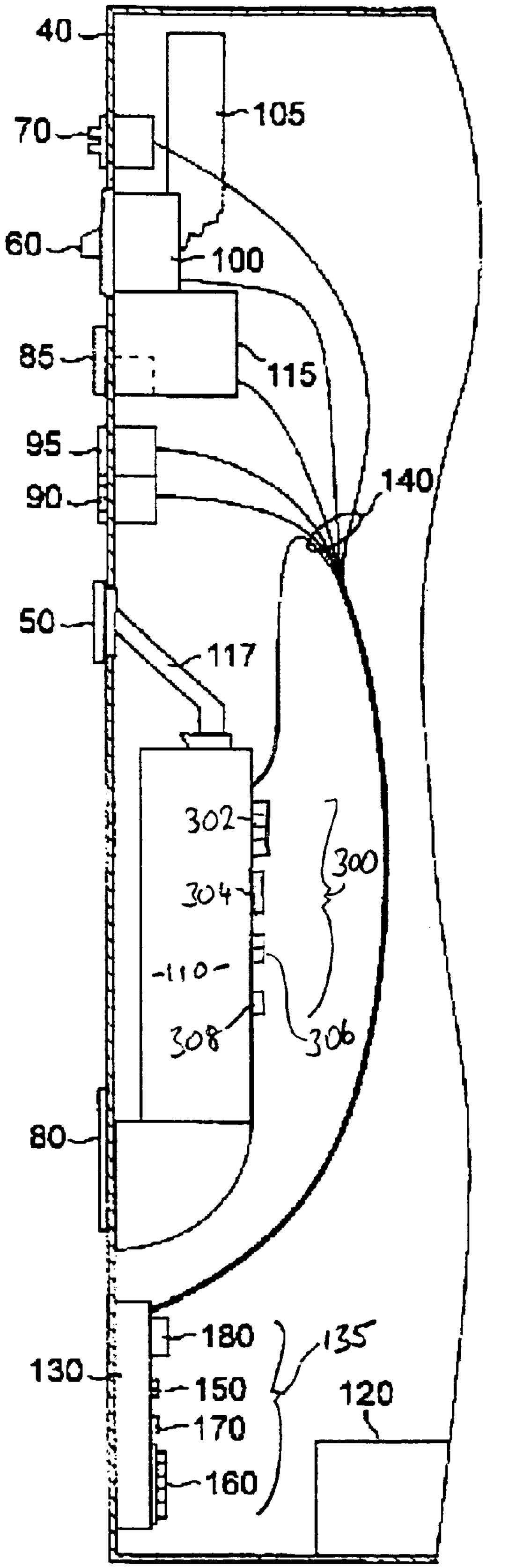
FIG. 2 is a partial cut-away side view of the front panel of the vending machine of FIG. 1.

FIG. 2 is a partial cutaway side view, not drawn to scale, of the vending machine 1 of FIG. 1 showing a typical component layout along the control panel 40. Referring to FIG. 2, money acceptors, such as a bill validator 100 and a coin mechanism 110, are attached to the rear of the control panel 40 adjacent the bill insert and coin slots 60 and 50, respectively. The coin mechanism 110 is connected to the coin return recess 80 and to a coin passageway 117 leading to the coin slot 50. The bill validator 100 is connected to a bill stacker 105. The coin mechanism 110 and bill validator 100 are capable of discriminating coins and bills.

A bill escrow and payout unit 115 is positioned adjacent the bill payout recess 85 and is connected to the bill validator 100. The bill escrow and payout unit 115 is capable of dispensing bills as change through the bill payout recess 85. The bill validator 100 may divert deposited acceptable bills to the bill escrow and payout unit 115 to replenish its supply of bills for change. Suitable bill escrow and payout units 115 include those disclosed in U.S. Pat. No. 5,076,441, as well as others well-known in the art. A cash box 120 is also included in the vending machine 1.

The bill validator 100, coin mechanism 110, bill escrow and payout unit 115, card acceptor 70, keypad 90 and display 95 are connected to a vend controller 130 by communication lines 140. The controller 130 is further connected to data input/output devices 135, such as DIP switches 150, a keypad 160, an input/output port 170 and a display 180 to facilitate entering and updating of operating data and servicing of the vending machine 1. The components disposed behind the control panel 40 are not accessible to customers of the vending machine 1 and may only be accessed by service personnel.

The controller 130 may be arranged to receive various items of information from the bill validator 100 and coin mechanism 110 via the communication lines 140. In particular, each time an acceptable unit of money is validated by either the bill validator 100 or the coin mechanism 110, a signal is sent to the vend controller indicating the value of the received unit.

The controller 130 is operable to store an allowable overpay value, the purpose of which is described below, in a memory location (not shown) contained therein. This "allowable overpay" value can be altered by operation of the DIP switches 150.

Any coin mechanism capable of validating coins of different denominations may be used as the coin mechanism 110 in FIG. 2. In this embodiment, the coin mechanism 110 is provided with data input/output devices 300, including a keypad 302, display 304, DIP switches 306 and a communications port 308.

Figure 3:
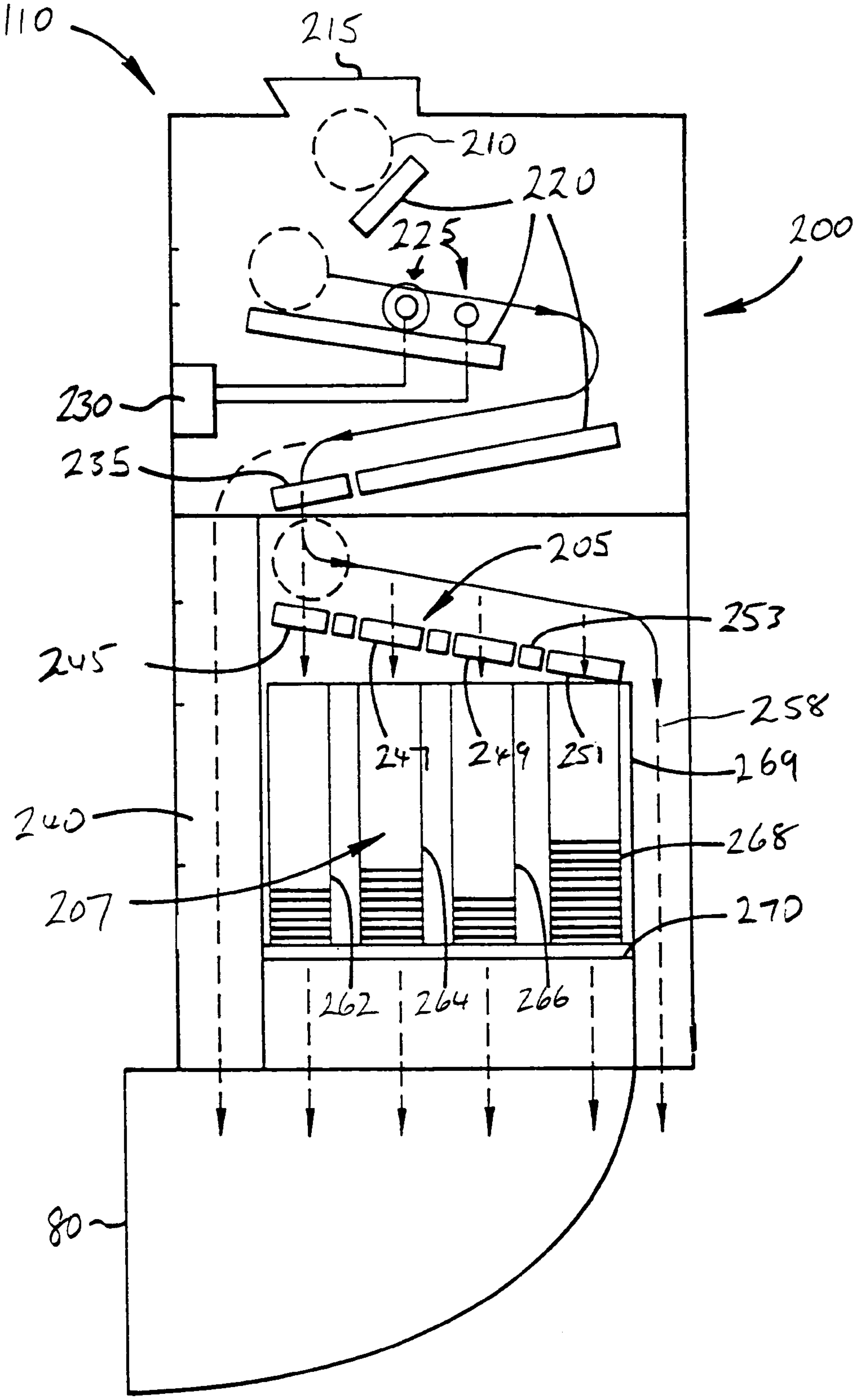
FIG. 3 is a schematic front view of a coin mechanism of the vending machine of FIG. 2.

Further details of the coin mechanism 110 are illustrated in FIG. 3. Referring to FIG. 3, coin mechanism 110 comprises a coin validator 200, a coin separator 205 and a coin storage region 207. The coin validator 200 receives inserted coins 210 through an opening 215 which is connected to the coin passageway 117 of FIG. 2. The coin 210 travels along ramp 220 in the coin validator 200 past sensors such as those shown at 225.

The sensors 225 generate electrical signals which are provided to a coin mechanism processor 230 such as a microprocessor or microcontroller. Suitable arrangements for sensors 225 include those described in GB 1 397 083, GB 1 443 934, GB 2 254 948 and GB 2 094 008 which are hereby incorporated by reference.

The processor 230 is connected to the data input/output devices 300, the coin return button 75 of FIG. 1 and also to the vend controller 130 via communications lines 140, shown in FIG. 2.

The electrical signals generated by the sensors 225 contain information corresponding to the measured characteristics of the coin, such as a coin's diameter, thickness, metal content and electromagnetic properties. Based on these electrical signals, the processor 230 is able to discriminate whether the coin is acceptable, and if so, the denomination of the coin 210. The coin mechanism processor 230 provides information concerning the denomination of accepted coins to the controller 130 over the communication lines 140 of FIG. 2.

If the coin 210 is unacceptable, the processor 230 controls a gate 235 to direct the unacceptable coin 210 to a reject chute 240. The reject chute 240 is connected to the coin return recess 80 of FIGS. 1 and 2. In the alternative, acceptable coins 210 are directed to the coin separator 205 by the gate 235. The coin separator 205 may have a number of gates 245, 247, 249, 251 arranged along a ramp 253 and also controlled by signals from the processor 230, for diverting the coin 210 from the ramp 253. The coin 210 may be diverted into respective containers 262, 264, 266 and 268, or the coin 210 may be allowed to proceed along ramp 253 to a path 258 leading to the cash box 120 shown in FIG. 2.

Each of the containers 262, 264, 266 and 268 is in the form of a coin tube arranged to store a vertical stack of coins of a particular denomination. Although only four containers are shown, any number may be provided.

The coin tubes are arranged within a removable cassette 269; such removable cassettes are well known in the art. As an example, a removable cassette is described in GB 2 246 897 A, the contents of which are incorporated herein by reference. The removable cassette is marked with a code, which indicates the denominations that are accommodated by the tubes within the cassette. The code is input using the keypad 302 on the coin mechanism 110 to inform the mechanism which cassette and tubes have been installed. Alternatively, the design may be such that the mechanism automatically recognises the type of cassette when it is inserted, or else the information could be provided remotely, or on a card.

The coin mechanism 110 may alternatively use passive routing techniques, such as those well known in the vending machine art, instead of the gates 245–251 for diverting the coin 210 from the ramp 253. Examples of suitable alternative configurations for the coin separator 205 are described in U.S. Pat. Nos. 3,844,297 and 4,106,610, which are hereby incorporated by reference.

A dispenser 270 associated with the coin tubes 262–268 is operable to dispense coins from the containers when change is to be given to a customer by the coin mechanism 110. The dispensed coins are delivered to the coin return recess 80 for collection. Suitable dispensers 270 include those described in U.S. Pat. Nos. 3,814,115 and 4,367,760, which are hereby incorporated by reference.

An alternative configuration may use a coin mechanism 110 that does not payout change. In such a configuration, a separate pre-loaded coin payout device, such as those well known in the gaming machine art, may be used to payout change.

In an alternative arrangement, the coin mechanism processor 230 stores the allowable overpay value, instead of the vending machine controller 130. The alteration of the allowable overpay value stored in the processor 230 may be achieved using the input/output devices 300, such as the keypad 302.

Any bill validator that is capable of discriminating unique characteristics of bill denominations may be used as the bill validator 100 of FIG. 2. Suitable bill validators 100 include those described in U.S. Pat. Nos. 4,628,194 and 5,222,584, which are hereby incorporated by reference.

Figure 4:
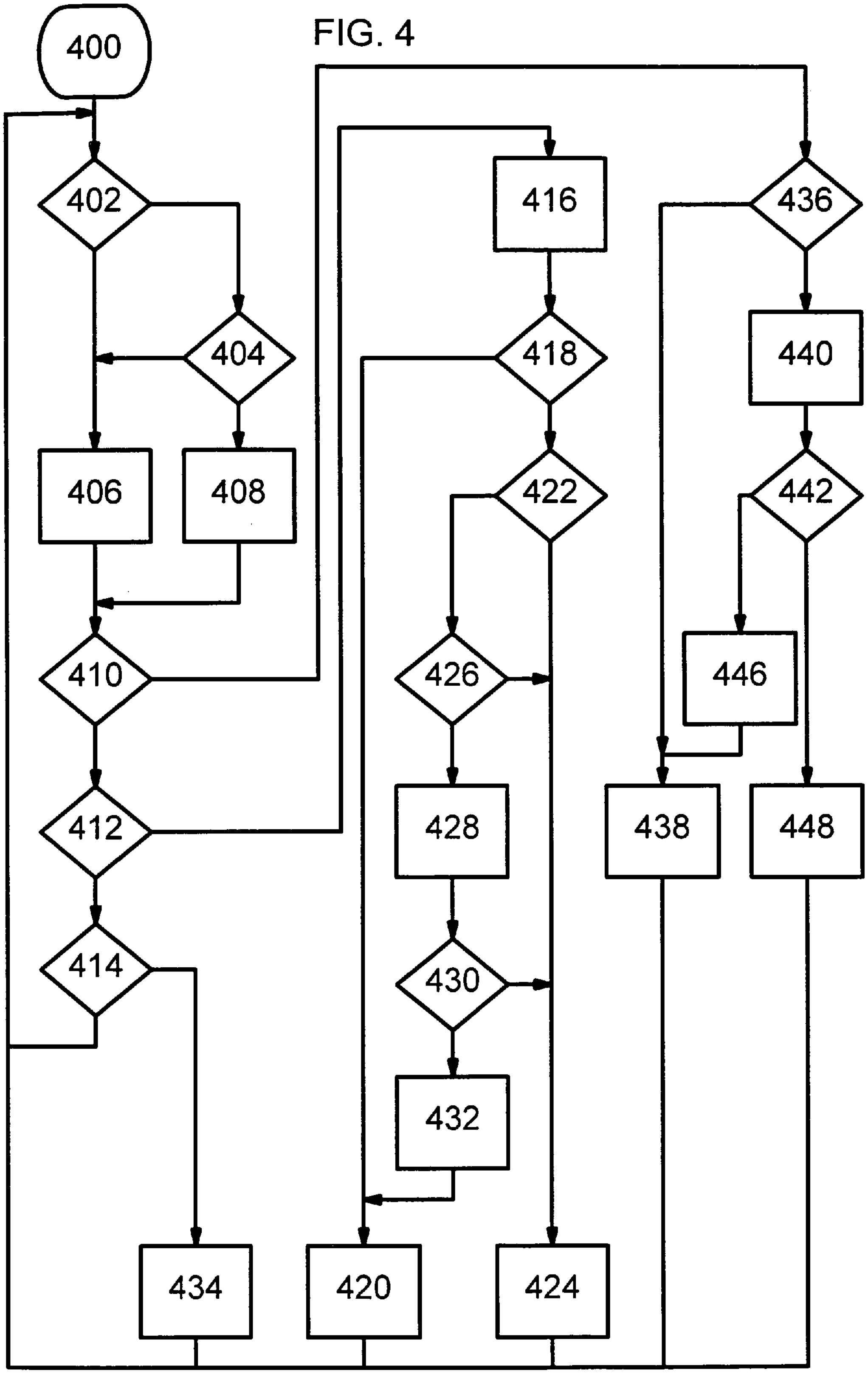
FIG. 4 is a flowchart of the operation of a coin validator in the vending machine.

Referring to FIG. 4, this is a flowchart of the operation of the vending machine, excluding details which are not of relevance to the present invention.

After the machine is started at step 400, there is a main program loop in which several conditions are checked in succession. This program loop starts with a group of steps 402 to 408, which determine whether or not an "exact change" indication is given by the display 95. There then follows a step 410 to determine whether the keypad 90 has been operated to request a vend, a step 412 to check whether a coin has been inserted and a step 414 to check whether the coin return button 75 has been operated to request a refund of deposited money. The main program loop is followed until one of the conditions tested in steps 410, 412 and 414 is met.

As indicated above, the machine stores an allowable overpay amount. Step 402 checks to determine whether this is zero. If it is zero, this means that vends will only take place if it is ensured that the customer will not pay more than the specified price of the selected product. In these circumstances, the program proceeds to step 406, to ensure that the correct change light is OFF. This is because, where the allowable overpay amount is zero, the customer will not be short-changed (as will be clear from the following description) and therefore he does not require a warning at this stage.

If the allowable overpay is greater than zero, the program proceeds from step 402 to step 404. Here, the program checks whether the amount of available change is inadequate to refund the value of the highest-denomination coin which is not itself refundable. For example, if all one pound coins are sent to the cashbox 120 and are thus not available for change, then at step 404 the program checks to determine whether the amount of available change is less than one pound. If so, the program proceeds to step 408, to ensure that the "exact change" display is ON. This is because there is a significant chance that the customer will be short-changed if he does not insert the correct amount of payment. Otherwise, the program proceeds to step 406 to ensure that the display is OFF.

In step 404, and in the other steps described below in which the amount of available change is calculated, various techniques can be used to achieve this. The number of coins stored within each change tube may be determined, e.g. by using level sensors and/or counting the number of coins sent to and dispensed from the tubes. See, for example, EP-A-76640, incorporated herein by reference. The total amount of available change may be calculated simply by summing the values of the coins stored in the coin tubes. However, this could lead to difficulties in circumstances in which a lesser amount of change is required, but the distribution of the denominations does not permit such a lesser amount to be dispensed. Accordingly, the amount of available change preferably takes into account the distributions of the denominations which can be dispensed. One way of achieving this would be to use an algorithm such as those described in WO-A-94/03875, or WO-A-95/14290, or GB Patent Application No. 9819669.4, filed 9 Sep., 1998, the contents of all of which are incorporated herein by reference. It is possible using those algorithms, or other known algorithms, to determine whether a given distribution of coins of different denominations are capable of being used to dispense a specific value, or, if not, to calculate the closest lower value which is available for dispensing using that distribution.

After step 406 or 408, the program then proceeds to step 410, and assuming no vend has yet been requested, to step 412.

When a coin is detected, the program proceeds from step 412 to 416. Here, the coin is tested. This involves checking the sensor measurements against sets of acceptance criteria each associated with a different denomination.

In many coin mechanisms it is possible for an engineer selectively to enable or inhibit particular denominations. In such a machine, the program 416 would simply check the sensor measurements against the parameters for the enabled denominations.

At step 418, the program determines whether or not the inserted coin is a valid coin of an acceptable denomination. If not, the program proceeds to step 420, wherein the coin is rejected and refunded via the coin return 80.

Otherwise, the program proceeds to step 422. At this step, the program determines whether or not the coin is of a denomination which is sent to the cashbox 120, rather than sent to one of the coin tubes 262–268. If the coin is not intended to be sent to the cashbox, the program proceeds to step 424 where the coin is accepted and directed to the appropriate destination, and a credit value is incremented by the value of the inserted coin. The credit value represents the total amount inserted by a customer during the current transaction.

If the coin is intended to be sent to the cashbox 120, the program proceeds from step 422 to step 426. At step 426, the program determines whether the available change in the tubes 262–268 is adequate to enable repayment of the value of the inserted coin. If so, the program proceeds to step 424, for accepting the coin and increasing the credit value.

Otherwise, the program proceeds from 426 to step 428, wherein the program calculates a potential overpay amount, which represents the difference between the potential accumulated credit value (i.e. including the value of the deposited coin) and the available change. As indicated above, the distribution of the coins available in the tubes 262–268 is taken into account, so that the maximum available change which is equal to or less than the accumulated credit value is calculated. The potential overpay value is the maximum amount which may be lost by the customer as a result of the insertion of the coin.

At step 430, the program compares this potential overpay amount with the stored allowable overpay amount. If the potential overpay amount exceeds the allowable overpay, then the program proceeds to step 432. At this point, the "exact change" indication is repeatedly flashed on and off on the display 95, and a timer is started so that the flashing of the display is terminated after a predetermined period (e.g. 10 seconds). The program proceeds from step 432 to step 420, wherein the coin is rejected. The "exact change" indication enables the customer to perceive that the refund of the coin occurred because there was a risk that retaining the coin would result in the customer being excessively short-changed.

In the illustrated embodiment, the determination of whether or not to accept or reject a coin, which takes place at steps 422, 426, 428 and 430, occurs after a coin has been inserted and validated. In an alternative embodiment, this determination can be performed for all potentially acceptable coins before the transaction takes place, taking into account the available change. Then, any potentially acceptable coin which does not meet the required criteria will be inhibited from acceptance (i.e., if the coin is subsequently inserted, it will be rejected). This reduces the amount of processing required in the short interval between the time at which a coin is validated and a time at which an accept/reject decision is required. The determination of which coins to inhibit can be repeated each time there is an alteration in the number of coins available for change.

If the potential overpay does not exceed the allowable overpay, the program proceeds from step 430 to step 424, to accept the coin and increase the stored credit value.

After either rejecting the coin at step 420 or accepting it at step 424, the program returns to the main loop.

At any time, the customer can operate the coin return button 75 to request a refund. This is detected at step 414, and the program proceeds to step 434, wherein change is dispensed and the credit value is cleared to zero. Normally, the amount of change dispensed will equal the amount of the credit value. However, if the allowable overpay is not zero, then because of steps 428 and 430, there is a possibility that the value of the dispensed coins will be less than the credit value. However, the difference will never exceed the allowable overpay value.

When a customer makes a vend selection, this is detected at step 412 and the program proceeds to step 436. Here, the vending machine determines whether the product is available and whether the credit value is at least equal to the product price. If one or both of these conditions is not met, then the program proceeds to step 438. This step is reached when the vend is not permissible. The program then returns to the main loop. The customer could then select a different product, or request a payment refund.

It is not necessary that any particular action be carried out at step 438, but if desired it would be possible in an alternative embodiment for the vending machine to refund the inserted money and/or provide an indication on the display 95 that the vend cannot be made.

If the product is available and sufficient credit has been accumulated, the program proceeds from step 436 to step 440. Here, the program calculates an overpay amount, which is equal to the difference between the vend price and the credit value, minus the available change. This overpay amount represents the amount by which the customer will be short-changed if the vend is made. The amount which is potentially required to be refunded as determined at step 440 is less than that calculated at step 428, because the vend price is taken into account. Nevertheless, the distribution of coins within the change tubes 262 to 268 may be such that this will give rise to a greater overpay amount.

The program then proceeds to step 442 and determines here whether this overpay amount is greater than the allowable overpay amount. If so the program proceeds to step 446. This is therefore reached if the machine determines that the vend is not permissible. At step 446, the display 95 is caused to flash on and off the "exact change" indication, and the above-mentioned timer is operated so that the flashing of the display will terminate after the predetermined interval. The program then proceeds to step 438.

If, however, the overpay is less than or equal to the allowable overpay, the program proceeds to step 448, wherein the product is and the credit value is reduced by the value of the dispensed product.

Step 448 could also cause change to be dispensed and the credit cleared to zero. However, this does not happen in the preferred embodiment, which is a multi-vend machine, and in which the user can request a number of vends in succession, and, when finished, operate coin return button 75 to refund his changed.

The "exact change" indication provided at step 408 provides a warning to customers, before they have started a transaction, that insufficient change may be available, but it is given only on condition that the available change is less than the highest-denomination non-refundable coin.

The warnings given in step 432 and 446 indicate respectively that the inserted coin or requested vend are not acceptable because of an insufficient change condition. The customer is therefore able to perceive that, and does not think that the failure to accept the coin or perform the vend is a result of misvalidation or an incorrect operation of the machine.

In the embodiment described above, a coin will not be accepted if this gives rise to an overpay amount which is greater than the allowable overpay amount. This means that there is a potential overpay even if no purchase takes place. In an alternative embodiment, a coin is rejected if this gives rise to any non-zero overpay amount, so that the customer will never be short-changed if a refund is requested. This embodiment can be achieved simply by modifying step 430 such that it compares the potential overpay amount with zero, instead of with the stored allowable overpay amount. A further modification is also possible, to take into account that a customer may or may not be willing to proceed with a purchase with the risk of being short-changed. In this further modification, a coin is rejected if it results in a non-zero overpay amount. However, if the coin, or a coin of the same denomination, is re-inserted within a brief predetermined period, for example 30 seconds, then the coin is rejected only if it results in an overpay amount which exceeds the predetermined allowable overpay amount.

In either of these alternative embodiments, the arrangement may be such that the first "exact change" indication, given at step 408, is omitted, so that the customer relies only upon the temporary indications provided at steps 432 and 446. As a further modification, the "exact change" indication given at step 408 may be provided irrespective of whether or not the allowable overpay amount is zero.

For the purposes of clarity, the flowchart of FIG. 4 describes the operation of the vending machine in a sequential manner. In practice, however, a number of the described routines may take place in a non-sequential, for example event-driven, manner. Thus, for example, there may be one set of routines for determining whether a vend may take place, this routine being carried out in response to the selection of a vend; a second routine for determining whether a coin should be inhibited, this routine taking place at each stage of a transaction (or whenever a coin is directed to or dispensed from a change tube); and a further routine for determining the status of the "exact change" indicator, this routine being initiated, for example, when an inhibited coin has been rejected or a vend has been denied.

The operations performed in the flowchart of FIG. 4 may be carried out either by a coin mechanism controller, e.g. microprocessor 230, or the vending machine controller 130, or the functions may be split between these devices.

In the above arrangement, the determination of available change and the provision of the "exact change" indication relate only to coins. The operations could however be extended to include banknotes in addition to or instead of coins, assuming that some denominations of banknotes are refundable.

Although the two types of indications given by the display 95 for indicating an insufficient change condition (i.e. the indication given at step 408 and the indications given at steps 446 and 432) are similar, they need not be. They could alternatively be visually distinctive, and could even be provided by different display devices. Also, the indication given at step 432, when a coin is rejected, may differ from that given at step 446, when a vend is prevented.

Many modifications are possible in the described embodiment without departing from the teachings of the present invention. All such modifications are intended to be encompassed by the accompanying claims. For example, although the vending machine 1 of FIGS. 1 and 2 has three money acceptors, i.e. a bill validator 100, a coin mechanism 110, and a card acceptor 70, any number or combination of money acceptors that are capable of validating any number of different monies may be employed in a system according to the present invention.

What is claimed is:

1. A vending machine, which is operable to accept monetary units in a plurality of denominations, and to dispense change in at least one of said denominations but not in at least one further denomination, the vending machine having display means arranged to give first and second indications that insufficient change may be available from the machine to a customer making a purchase, the first indication being given as a warning prior to a transaction being initiated when the amount of available change in the machine is less than the value of the highest-value among said at least one further denomination, and the second indication being given after a transaction has been initiated and a monetary unit has been deposited, the second indication being given in dependence on parameters including the money available for change and the value of the deposited monetary unit, each indication being produced in response to the detection of a respective set of conditions.

2. A vending machine as claimed in claim 1, wherein the circumstances giving rise to the second indication also cause the deposited monetary unit to be refunded.

3. A vending machine which has a display means and which is operable, in response to selection of a product for vending, to compare the difference between the value of deposited money and the product price with the available change, and to inhibit the vend if that difference exceeds a predetermined allowable overpay amount, the machine being operable in these circumstances also to cause the display means to provide an indication that insufficient change may be available from the machine and to allow selection of a product of different price.

4. A vending machine which is operable to prevent acceptance of a monetary unit in dependence on the availability of monetary units for dispensing as change and operable to inhibit a vend operation in dependence on a vend price, a credit value corresponding to the value of one or more accepted monetary units and the availability of monetary units for dispensing as change, said vending machine having display means arranged to provide an indication to a customer in response to receipt of a monetary unit which is so prevented from being accepted.

5. A vending machine as claimed in claim 4, wherein the display means is arranged to provide an indication to a customer when a vend operation is inhibited.

6. A vending machine as claimed in claim 4, wherein the machine is arranged, when a vend has been inhibited, to allow a customer to select a vend at a different price.

7. A vending machine comprising:

means for accepting payments in units of different denominations, for performing vends, for determining that insufficient change is available, and for dispensing change, wherein if insufficient change is available then either (i) a lesser amount of change is dispensed or (ii) a requested vend is inhibited depending on whether the difference between the available change and the correct change is equal to or less than a predetermined allowable overpay amount;

means for providing a warning indication prior to initiating a transaction if the available change meets a predetermined criteria and if the allowable overpay amount is non-zero; and means for permitting alteration of a stored parameter defining the allowable overpay amount.

8. A vending machine as claimed in claim 7, wherein the predetermined criterion is met when the available change is less than the value of the lowest denomination non-refundable payment unit.

9. A vending machine as claimed in claim 7, which is operable to provide an "exact change" indication to a customer when a requested vend is inhibited.

10. A vending machine as claimed in claim 9, wherein the machine is operable, when inhibiting a vend, to permit the customer to request a vend at a different price.

* * * * *